United States Patent [19]

Tansei et al.

[11] Patent Number: 4,461,334

[45] Date of Patent: Jul. 24, 1984

[54] HEAVY DUTY PNEUMATIC TIRES

[75] Inventors: Hikaru Tansei, Higashimurayama; Katsuhiko Kajimoto, Kodaira; Mikio Nomata, Tanashi, all of Japan

[73] Assignee: Bridgestone Tire Company Limited, Tokyo, Japan

[21] Appl. No.: 515,735

[22] Filed: Jul. 21, 1983

[30] Foreign Application Priority Data

Jul. 21, 1982 [JP] Japan .................................. 57-125859

[51] Int. Cl.³ ............................................. B60C 11/00
[52] U.S. Cl. .................................. 152/209 R; D12/140
[58] Field of Search .......... 152/209 R, 209 D, 209 A; D12/140, 141, 142, 145, 152

[56] References Cited

U.S. PATENT DOCUMENTS

| 3,411,559 | 11/1968 | Verdier | 152/209 R |
| 3,570,571 | 3/1971 | Riches | 152/209 R |
| 3,799,231 | 3/1974 | Boileau | 152/209 R |
| 4,320,790 | 3/1982 | Corner et al. | 152/209 R |

FOREIGN PATENT DOCUMENTS 2457185 1/1981 France ........................... 152/209 R Primary Examiner—Michael W. Ball
Attorney, Agent, or Firm—Sughrue, Mion, Zinn, Macpeak, and Seas

[57] ABSTRACT

A heavy duty pneumatic tire is disclosed, which has a tread pattern formed in a tread divided into a plurality of lands by a plurality of longitudinal grooves extending circumferentially of the tread, among which each of a first land in at least a side edge region of the tread and a second land adjacent thereto has an arrangement of blocks defined by transverse grooves arranged at a substantially equal interval in the circumferential direction of the tread. In this tread pattern, each block of the first land is arranged in zigzag form opposite to two adjoining blocks of the second land, the opposed groove walls of the longitudinal groove defining the first and second lands have a minimum distance corresponding to not more than 3% of the tread width, and the remaining longitudinal groove(s) located in a center of the tread or sandwiching the central land of the tread has a groove width corresponding to 4-10% of the tread width.

8 Claims, 4 Drawing Figures

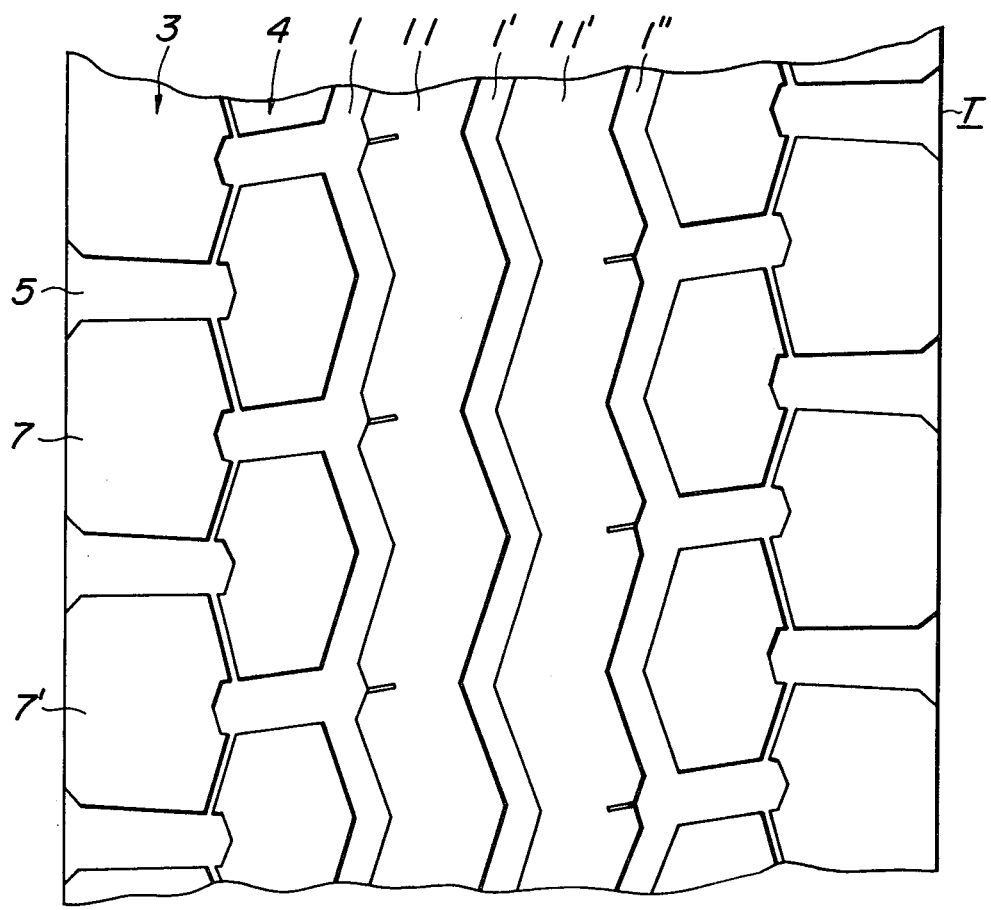
FIG_4

HEAVY DUTY PNEUMATIC TIRES

This invention relates to heavy duty pneumatic tires, and more particularly to an improvement in the tread pattern of the heavy duty pneumatic tire which can produce a sufficiently high adhesive friction or traction without causing an uneven wear under running conditions of the tire, particularly the running on wet road under a load.

As to a drive-wheel, the traction of the tired wheel serves to transmit a driving power based on an output of an engine to a road surface so as to pull a vehicle against a friction resistance between a load in the travelling of the vehicle inclusive of the starting and the road surface. Further, such traction acts to effectively transmit a braking power applied to the wheel into the road surface during the travelling of the vehicle inclusive of free wheels. As apparent from the above, the driving or braking power exceeding the above traction results in the occurrence of slipping or skidding. Therefore, a tread pattern capable of producing a sufficiently high traction even in the running under rainfall or under other wet-pavement conditions is particularly required in heavy duty pneumatic tires in view of the running safety.

In general, the tread pattern of this type (hereinafter referred to as traction pattern) has grooves extending widthwisely of the tire (hereinafter referred to as transverse groove), so that it is apt to cause an uneven wear showing a saw blade form about blocks arranged in a side edge region (or shoulder) of the tread in the circumferential direction of the tire, i.e. an abnormal wear being called as heel and toe wear. Particularly, an uneven wear of irregularizing the blocks alternately is a developmental type of the abnormal wears. The occurrence of the abnormal wear not only deteriorates vibration performance and wear life, but also reduces the traction. In order to solve this drawback, the heel and toe wear should first be suppressed at an initial using stage of the tire.

As is well-known, the heel and toe wear among the abnormal wears inherent to the traction pattern results from the difference in behavior between a step-in side and a kick-out side of each block during the rotation of the tire. Now, in order to prevent the heel and toe wear, there has hitherto been taken a countermeasure wherein a platform is disposed in the transverse groove existent between the adjoining blocks to increase the rigidity of the block along the circumferential direction of the tread, whereby the movement of the block itself is reduced to make the difference in behavior between the step-in side and the kick-out side of the block small.

In this countermeasure, however, a traction performance on wet road (hereinafter referred to as wet traction performance) is considerably reduced due to the reduction of drainage property by the arrangement of the platform and the reduction of cutwater effect (edge effect) by the increase in the rigidity of the block. Of course, this tendency becomes extremely conspicuous at the last stage of wear and follows disadvantages.

It is, therefore, an object of the invention to effectively suppress the occurrence of abnormal wears in the traction pattern without the reduction of wet traction performance.

The inventors have made various studies and sufficient analyses with respect to the cause of producing the heel and toe wear, which is the origin of the abnormal wears, as previously mentioned and get the following new knowledge. That is, the heel and toe wear is not caused only by the simple rotation of the tire, but is first produced when a side force is applied to the tire and considerably accelerated during the rotation of the tire under an influence of the lateral force.

With the foregoing in mind, the inventors have found that both the heel and toe wear and the wet traction can simultaneously be solved by a novel means for increasing the rigidity of the block. That is, the lateral force mainly resulting in the occurrence of the heel and toe wear concentrates in the side edge region of the tire tread. Considering this fact, there is devised such an arrangement of the blocks that the rigidity of the block at the side edge region can be increased against only the lateral force but is not especially increased against a tangent force applied to the tread.

According to the invention, there is the provision of in a heavy duty pneumatic tire having a tread pattern formed in a tread divided into a plurality of lands by a plurality of longitudinal grooves extending circumferentially of the tread, among which each of a first land located in at least a side edge region of the tread and a second land located adjacent thereto is separated into blocks by transverse grooves arranged at a substantially equal interval in the circumferential direction of the tread and has a block arrangement showing substantially the same surface form in the circumferential direction of the tread, the improvement wherein:

(a) each block in said first land is arranged in zigzag form opposite to two adjoining blocks separated by said transverse groove in said second land;

(b) opposed groove walls of the longitudinal groove located between said first and second lands extend in substantially parallel with each other in the circumferential direction of the tread and have a minimum distance corresponding to not more than 3% of the width of the tread so as to produce the contacting of each block in said first land with at least one of the two adjoining blocks in said second land only by the action of lateral force during the running of the tire under a load; and (c) the remaining longitudinal groove(s) other than said longitudinal groove located between said first and second lands is located in a center of the tread or arranged so as to sandwich a central land of the tread and has a groove width corresponding to 4–10% of the tread width.

The invention will now be described with reference to the accompanying drawings, wherein:

FIGS. 2–4 are partial plan view illustrating traction patterns of the heavy duty pneumatic tire according to the invention, respectively.

Any one of the illustrated pneumatic tires is preferred to have a so-called radial type casing reinforcement comprising a carcass of at least one cord ply, whose cords extending substantially radially of the tire, and a belt of at least two cord plies, cords of which being crossed with each other at a relatively small angle with respect to the circumferential direction of the tire, and particularly represents a tread surface of a so-called traction tire requiring excellent traction and braking performances.

Figure 1:
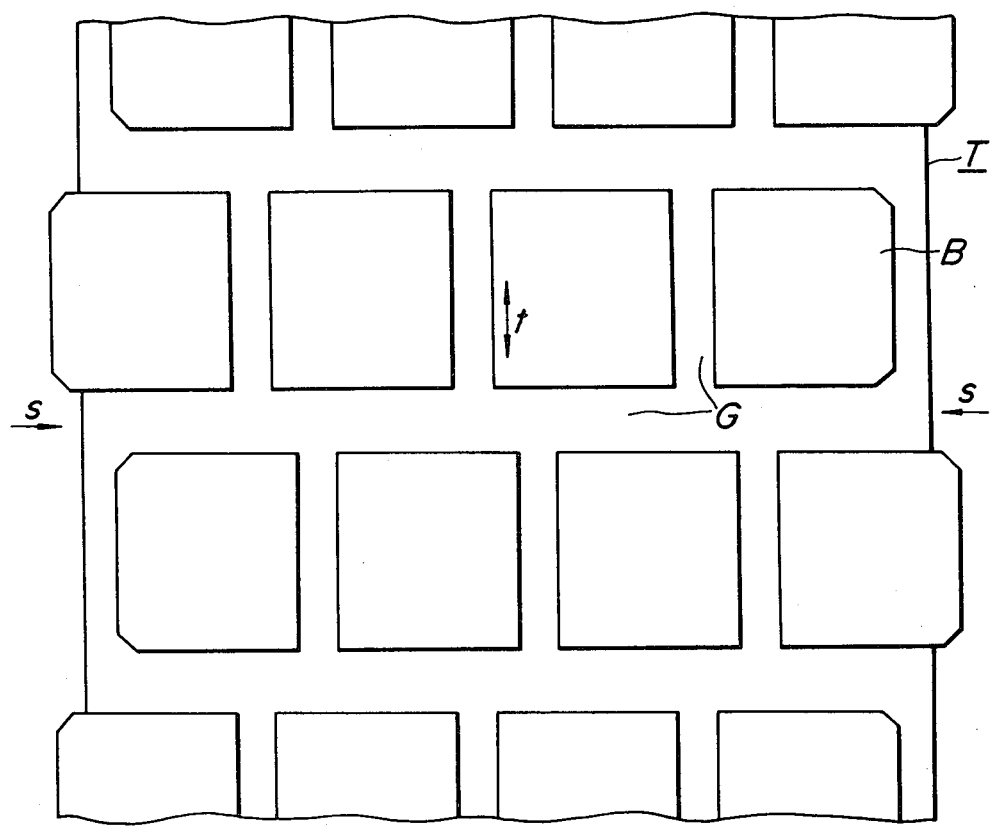
FIG. 1 is a partial plane view illustrating a traction pattern of the conventional tire.
Figure 2:
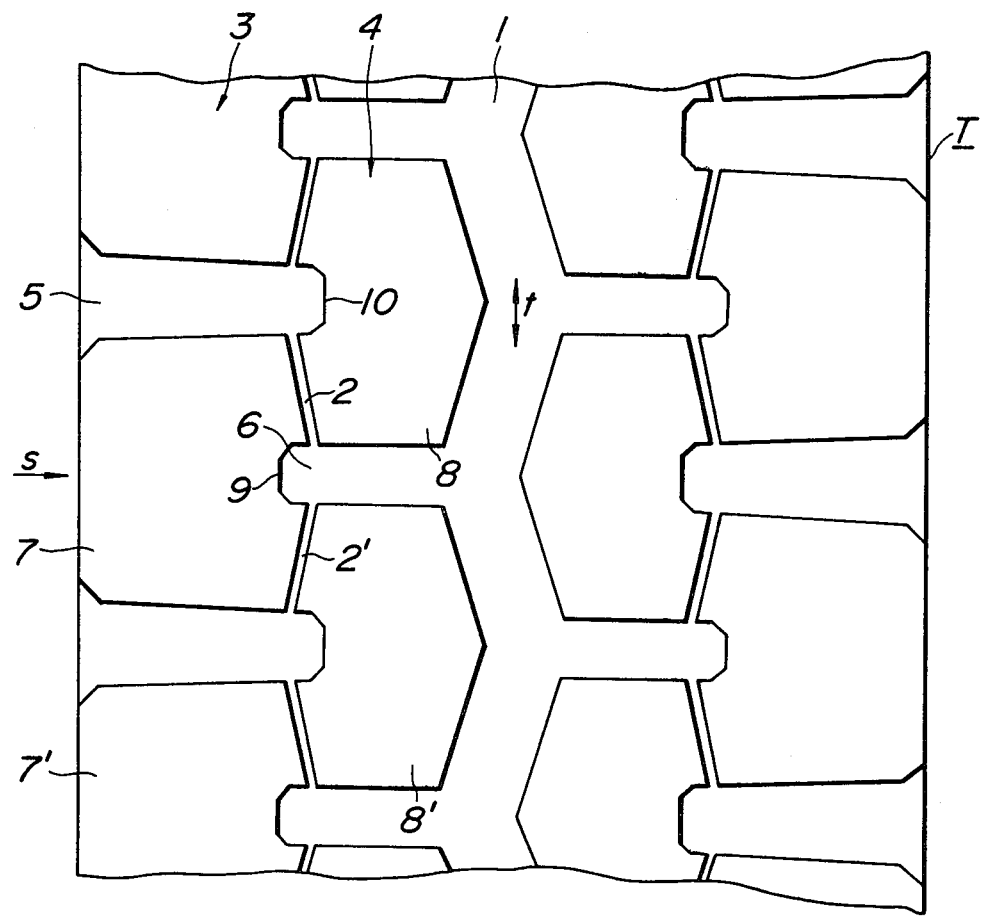

FIG. 1 is the conventional traction pattern, while FIG. 2 is a traction pattern according to the invention. The tread pattern of FIG. 1 is generally used in the prior art, so that its concrete explanation is omitted herein. In FIG. 1, a tread T is divided into many blocks B by grooves G arranged circumferentially and widthwisely of the tread, and arrows t and s represent directions of tangent force and lateral force applied, respectively.

In the pneumatic tire according to the invention as shown in FIG. 2, the tread T comprises one main groove 1 and a pair of fine grooves 2, 2' arranged at regular intervals to the main groove in a widthwise direction of the tread, which are called together as a longitudinal groove and extend circumferentially of the tread. The main groove 1 has a groove width corresponding to 4-10% of the tread width. When the groove width of the main groove 1 is less than 4% of the tread width, the drainage property significantly contributing to provide a wet traction required for the tire can not sufficiently be developed, while when the groove width exceeds 10%, there is caused a serious tendency of deteriorating wear properties of the tire, particularly wear resistance and uneven wear resistance.

In the fine grooves 2, 2', a minimum distance between opposed groove walls (or width of fine groove) is not more than 3% of the tread width, which corresponds to such a width that the opposed groove walls of the fine groove (2, 2') are first contacted with each other only when the lateral force is applied to the side edge region of the tread during the running of the tire, for example, mounted on a drive shaft of an actual vehicle. Preferably, the width of the fine groove is within a range of 0.5-2%. When the width of the fine groove exceeds 3%, even if the lateral force is applied to the tire, the opposed groove walls of the fine groove are not longer contacted with each other. Moreover, it is necessary that the opposed groove walls of the fine groove are substantially parallel to each other along the continuous direction of the fine groove from the viewpoint of uniformly preventing the uneven wear, and further the section of the fine groove is preferable to have a U-shape wherein each of the opposed groove walls is raised at an angle substantially perpendicular to the tread surface.

Thus, the tire tread T is divided into a first land 3 located at each of both side edge regions thereof and a second land 4 at a region located adjacent thereto by the longitudinal groove, i.e. main groove 1 and fine grooves 2, 2'. And also, each of these lands is further divided into blocks by transverse grooves 5, 6 peculiar to the traction pattern in the circumferential direction of the tread.

These transverse grooves are arranged at substantially equal intervals in the circumferential direction of the tread, whereby the first land 3 and second land 4 are divided into blocks 7, 7' - - - and blocks 8, 8' - - -, which have substantially the same surface form in the circumferential direction of the tread, respectively. Further, the block 7 of the first land 3 defined by the transverse groove 5 and the fine grooves 2, 2' is arranged in zigzag form opposite to the two adjoining blocks 8, 8' of the second land 4 sandwiching the transverse groove 6 therebetween.

In the tire having a tread pattern of the aforementioned block arrangement, when the lateral force s is applied to the first land 3 at ground contact area during the running of the tire under a load, the block 7 of the first land 3 comes into contact with at least one of the two adjoining blocks 8, 8' of the second land 4 and consequently the rigidity of the block of the first land 3 is substantially enhanced in the transverse direction of the tire, whereby the abnormal wear peculiar to the traction pattern as previously mentioned can effectively be prevented.

On the other hand, when only the tangent force t is applied to the tread T by the braking or driving operation, since the blocks 7, 7' and 8, 8' of the first and second lands 3, 4 are independent of each other, the rigidity of each of these blocks corresponds to the tangent force t, so that performances naturally required for the traction pattern are developed without unnecessarily raising the substantial rigidity of the block and with retaining sufficient drainage property and cutwater effect.

On the contrary, when using such a tread pattern that the block 7 of the first land 3 merely comes into contact with only one block of the second land 4, the abnormal wear at the block 7 of the first land 3 is not suppressed sufficiently. Because, the transverse grooves 5 and 6 in this pattern form a continuous straight line, so that the difference in the rigidity between the region having the transverse groove and the region having no transverse groove in the circumferential direction of the tread becomes too large and hence the tendency of causing the heel and toe wear becomes conspicuous.

In case of a tread pattern having such a wide width that the opposed groove walls of at least one of the fine grooves (2, 2') are not contacted with each other by the lateral force s or a tread pattern wherein at least one of the fine grooves 2, 2' is clogged so as to integrally unite the block of the first land with one of two adjoining blocks of the second land, the interdependence between the blocks of the first and second lands is produced in the rotational direction of the tire and rather the abnormal wear is locally made larger.

Although the above is explained with respect to the basic construction and effect of the invention, the inventors have made further investigations and found that the effect of substantially enhancing the rigidity in transverse direction of tire or the wet traction performance can further be improved by taking the following provisions when the block of the first land and two adjoining blocks of the second land are contacted with each other by the lateral force s.

Namely, the transverse groove 5 for separating the first land 3 into the blocks 7, 7' has a width corresponding to 5-12% of the tread width, and the transverse groove 6 for separating the second land 4 has a width equal to or less than the width of the transverse groove 5, and the length of the transverse groove 6 is equal to or less than that of the transverse groove 5. Furthermore, the block 7 of the first land 3 facing the transverse groove 6 for separating the second land 4 into the blocks 8, 8' has a notch recess 9 at a position of an extension of the transverse groove 6, while the block 8 of the second land 4 facing the transverse groove 5 for separating the first land 3 into the blocks 7, 7' has a notch recess 10 at a position of an extension of the transverse groove 5. The longitudinal grooves for defining the first and second lands 3, 4 are zigzag fine grooves 2, 2' having a pitch substantially equal to the distance between the adjoining transverse grooves, and the block 8' of the second land 4 is overlapped with two blocks 7, 7' of the adjacent first land 3 at a substantially equal rate in the circumferential direction of the tread, and the zigzag fine grooves 2, 2' gradually increase the widths of the blocks 7 and 8 in the first and second lands 3 and 4 from each of the kick-out side edge and step-in side edge along the transverse groove defining these blocks toward the circumferential direction of the tread. These provisions are practised in the tread pattern in FIG. 2. That is, these provisions contribute to totally improve the wear resistance with the balancing of block rigidity and the maintaining and improving of the wet traction performance when the lateral force or the driving and braking force is applied to the blocks in the first and second lands as previously mentioned.

Moreover, a better result is obtained when the invention is modified within the following ranges in addition to the above provisions. That is, at least lengths at the kick-out side edge and step-in side edge in the block 7 of the first land 3 are substantially equal to each other and correspond to 10–30% of the tread width. Furthermore, the zigzag grooves 2, 2' defining the first and second land extend along a polygon of two segments crossed with each other with respect to the circumferential line of the tire extending continuously straight in the circumferential direction of the tire, and an intersection angle of the polygonal line with respect to the circumferential line of the tire is within a range of 5°–20°. Moreover, the overlap length of each block 8, 8' of the second land 4 to the block 7 of the first land 3 in the circumferential direction of the tire is within a range of 30–50% of the length of the block 7 of the first land 3 measured along the edge of the tread. These provisions are also shown in the tread pattern of FIG. 2.

In the other embodiments of the invention, two or more main grooves are used instead of one main groove shown in FIG. 2 in order to adapt the tire to particular use conditions or particular vehicle, whereby a third land may be formed on the central region of the tread. This is shown in FIGS. 3 and 4.

Figure 3:
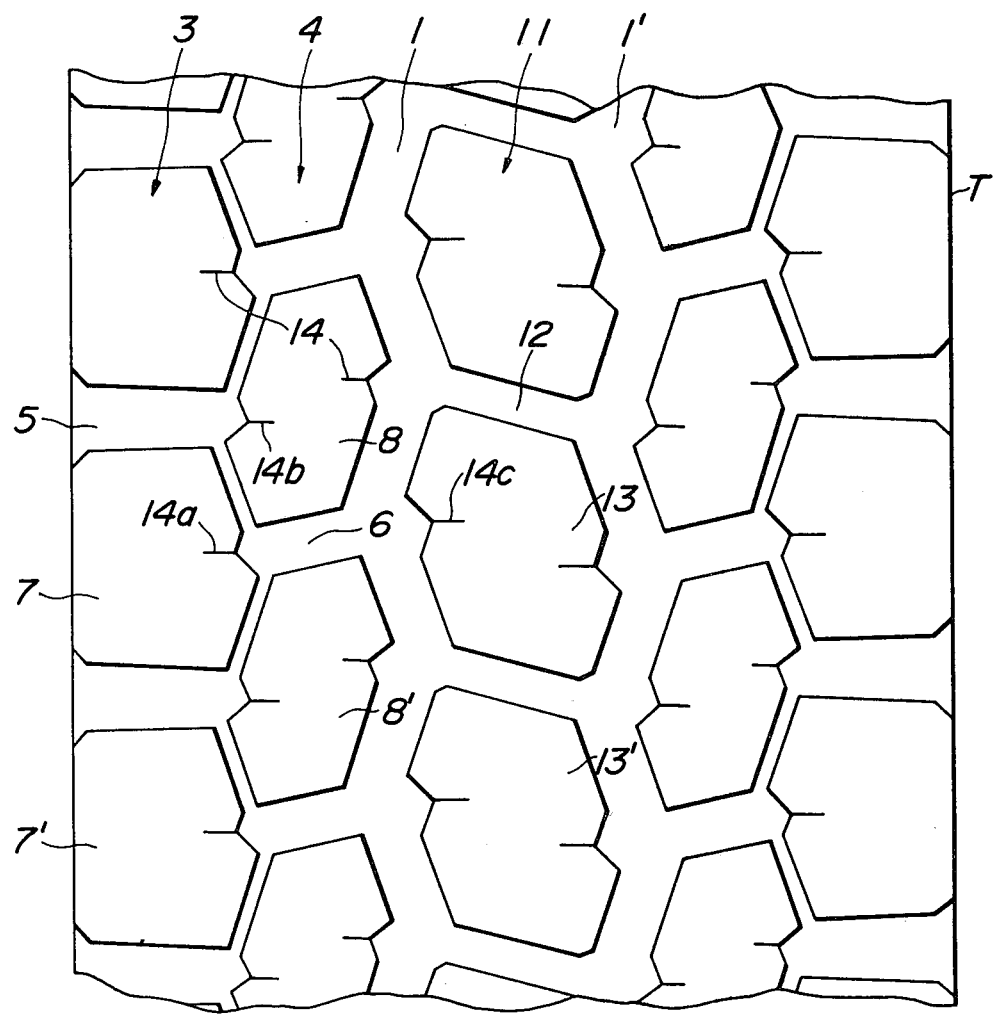

In the tread pattern of FIG. 3, two main grooves are disposed so as to leave a central region of the tread, whereby a third land 11 is defined between the two main grooves 1 and 1'. In the illustrated embodiment, the third land 11 is divided into blocks 13, 13' - - - by transverse grooves 12 having a groove width substantially equal to or less than the groove width of the transverse groove 6 for separating the second land 4 into blocks. Further, the arrangement of the blocks of the second land 4 to the blocks of the first and third lands 3 and 11 is an alternate relationship. Moreover, the block 8 of the second land 4 opposite to the transverse groove 5 has a sipe 14b notched in the sidewall of the block 8 at a position of an extension of the transverse groove 5 and similarly the blocks 7 and 13 of the first and third lands 3 and 11 opposite to the transverse groove 6 have sipes 14a and 14c at a position of an extension of the transverse groove 6, respectively, whereby the ground contact pressure distribution of the tread can be made uniform. Such sipes may be formed in the tires shown in FIGS. 2 and 4. The tread pattern of FIG. 3 is particularly preferable in view of the wear resistance.

The third land may be a rib form, preferably zigzag rib form instead of the block form as shown in FIG. 3. FIG. 4 is the case wherein the third land consists of two zigzag ribs 11, 11' defined by three main grooves 1, 1', 1" extending zigzag circumferentially of the tread provided that the main groove 1' is located in the center of the tread. Furthermore, two or more longitudinal grooves extending circumferentially of the tire may be arranged in the third land, or the groove width of such longitudinal grooves may be narrowed to an extent that the opposed groove walls of the groove come into contact with each other at ground contact area during the running of the tire under a load. The tread pattern of FIG. 4 is particularly preferable in view of the high-speed durability.

Although the above three embodiments have been described with reference to the traction pattern formed on the whole of the tread, the invention may be applied to only one side of the tread with respect to the tread center. Furthermore, the invention is effectively enforced to pneumatic tires for heavy vehicles, particularly so-called radial tires having a carcass of radial or semi-radial structure as a casing reinforcement.

The invention will now be described with reference to the following example.

In order to evaluate the properties as shown in the following Table, there were used four test tires, i.e. conventional tire A having a usually used traction pattern shown in FIG. 1 and present tires B, C and D having traction patterns according to the invention shown in FIGS. 2, 3 and 4, respectively.

In the evaluation, the uneven wear resistance is indicated by an index for reciprocal of level difference produced by heel and toe wear in the block of the first land after the test tire was run over a distance of 50,000 km, the traction performance is indicated by an index of traction on wet asphalt road, the wear resistance is indicated by an index of running distance till the tread groove is completely worn, and the high-speed durability is indicated by an index for reciprocal of crack length due to the failure by heat generation at the belt end of the tire after the running. The larger the index value, the better the property.

| Evaluation item | Conventional tire A (FIG. 1) | Present tire B (FIG. 2) | Present tire C (FIG. 3) | Present tire D (FIG. 4) |
| --- | --- | --- | --- | --- |
| uneven wear resistance | 100 | 170 | 150 | 150 |
| traction performance | 100 | 130 | 130 | 130 |
| wear resistance | 100 | 130 | 150 | 130 |
| high-speed durability | 100 | 100 | 100 | 120 |

As apparent from the above table, all of the tires B, C and D according to the invention are excellent in the uneven wear resistance, traction performance and wear resistance as compared with the conventional tire A. Furthermore, the high-speed durability of these tires B, C and D is equal to or more than that of the conventional tire A, and particularly the tire D is considerably excellent in the high-speed durability as compared with the other remaining tires.

As mentioned above, the heavy duty pneumatic tires according to the invention can prevent the occurrence of abnormal wears with producing a sufficiently high traction on wet asphalt road because of the particular traction pattern such as the arrangement of fine groove between the first and second lands having a width that the opposed groove walls are contacted with each other only by the lateral force during the running under a load to enhance the rigidity and the like.

What is claimed is:

1. In a heavy duty pneumatic tire having a tread pattern formed in a tread divided into a plurality of lands by a plurality of longitudinal grooves extending circumferentially of the tread, among which each of a first land located in at least a side edge region of the tread and a second land located adjacent thereto is separated into blocks by transverse grooves arranged at a substantially equal interval in the circumferential direction of the tread and has a block arrangement showing substantially the same surface form in the circumferential direction of the tread, the improvement wherein:

(a) each block in said first land is arranged in zigzag form opposite to two adjoining blocks separated by said transverse groove in said second land;

(b) opposed groove walls of said longitudinal groove located between said first and second lands extend in substantially parallel with each other in the circumferential direction of the tread and have a minimum distance corresponding to not more than 3% of the width of said tread so as to produce the contacting of each block in said first land with at least one of the two adjoining blocks in said second land only by the action of lateral force during the running of the tire under a load; and (c) the remaining longitudinal groove(s) other than said longitudinal groove located between said first and second lands is located in a center of said tread or arranged so as to sandwich a central land of said tread and has a groove width corresponding to 4-10% of said tread width.

2. A heavy duty pneumatic tire according to claim 1, wherein said longitudinal groove of zigzag form defining said first and second lands extends along a polygon of line segments crossing at an angle of 5°-20° with respect to the circumferential line of the tire.

3. A heavy duty pneumatic tire according to claim 1, wherein said minimum distance between the opposed groove walls of said longitudinal groove defining said first and second lands is within a range of 0.5-2% of said tread width.

4. A heavy duty pneumatic tire according to claim 1, wherein said longitudinal groove(s) other than said longitudinal groove defining said first and second lands defines a third land.

5. A heavy duty pneumatic tire according to claim 4, wherein said third land has an arrangement of blocks separated by transverse grooves.

6. A heavy duty pneumatic tire according to claim 4, wherein said third land is a zigzag rib.

7. A heavy duty pneumatic tire according to claim 6, wherein said third land consists of at least two zigzag ribs defined by at least three longitudinal grooves, one of which grooves being located at a center of said tread.

8. A heavy duty pneumatic tire according to claim 1, wherein said tire has a casing reinforcement of radial or semi-radial carcass structure.

* * * * *